(12) United States Patent
Hsieh et al.

(10) Patent No.: US 10,807,873 B2
(45) Date of Patent: Oct. 20, 2020

(54) METHOD FOR MAKING MULTIPOROUS CARBON MATERIALS BY USING BIO-OILS

(71) Applicant: CPC Corporation, Taiwan, Kaohsiung (TW)

(72) Inventors: Tzu-Hsien Hsieh, Kaohsiung (TW); Hong-Ping Lin, Taipei (TW); Yang-Chuang Chang, Kaohsiung (TW); Haw-Yeu Chuang, Kaohsiung (TW)

(73) Assignee: CPC CORPORATION, TAIWAN, Kaohsiung (TW)

(*) Notice: Subject to any disclaimer, the term of this patent is extended or adjusted under 35 U.S.C. 154(b) by 339 days.

(21) Appl. No.: 15/881,477

(22) Filed: Jan. 26, 2018

(65) Prior Publication Data

US 2019/0119118 A1  Apr. 25, 2019

(30) Foreign Application Priority Data

Oct. 25, 2017  (TW) .............................. 106136769 A

(51) Int. Cl.
*C01B 32/318* (2017.01)
*C01B 32/348* (2017.01)
*C01B 32/342* (2017.01)

(52) U.S. Cl.
CPC .......... *C01B 32/318* (2017.08); *C01B 32/342* (2017.08); *C01B 32/348* (2017.08); *C01P 2004/04* (2013.01)

(58) Field of Classification Search
CPC .... B01J 20/3057; C01B 32/30; C01B 32/312; C01B 32/342; C01B 32/348
See application file for complete search history.

(56) References Cited

U.S. PATENT DOCUMENTS

| 4,937,223 A | 6/1990 | Yamaguchi |
| 8,114,510 B2 | 2/2012 | Dai et al. |
| 8,828,533 B2 | 9/2014 | Dai et al. |
| 2014/0227325 A1 | 8/2014 | Naskar et al. |

FOREIGN PATENT DOCUMENTS

| CN | 101585527 A | * 11/2009 | |
| CN | 104030268 A | * 9/2014 | |
| EP | 2025656 A1 | 2/2007 | |
| WO | WO-2018229220 A1 | * 12/2018 | ............. C01B 32/00 |

* cited by examiner

*Primary Examiner* — Richard M Rump
(74) *Attorney, Agent, or Firm* — Muncy, Geissler, Olds & Lowe, P.C.

(57) ABSTRACT

The invention provides a method for making multiporous carbon material from a bio-oil produced by a biomass thermochemical process. The bio-oil is blended with a resin and a Zinc Oxide (ZnO) template as a major component of a precursor. The pore sizes of the carbon material made by the invention comprise mesopores and micropores to form the multiporous carbon material. The main production steps include: (1) mixing the precursor with a crusher, (2) packing the precursor, (3) heating for carbonization: holding 350° C. for 1 hour then holding 900° C. for 2 hours, and (4) washing the ZnO with hydrochloric acid by adjusting the pH value to less than 1.

4 Claims, 9 Drawing Sheets

METHOD FOR MAKING MULTIPOROUS CARBON MATERIALS BY USING BIO-OILS

CROSS-REFERENCE TO RELATED APPLICATIONS

This non-provisional application claims priority under 35 U.S.C. § 119 on Patent Application No. TW106136769 filed in Taiwan, Republic of China Oct. 25, 2017, the entire contents of which are hereby incorporated by reference in its entirety.

FIELD OF THE INVENTION

The present invention relates to a method for making multiporous carbon material, and more particularly to a technique for producing a multiporous carbon material using a bio-oil produced by a thermo-chemical process.

BACKGROUND OF THE INVENTION

Multiporous carbon material is a prospective new material, in particular, nanopore multiporous material has characteristic of high surface area, which has been widely used in different fields of industries and products. The application of the multiporous material includes: insulating materials, because of their high specific surface area characteristics. In addition, Cushioning materials, sound absorbing materials, adsorbent materials, catalyst carriers, gas separation, purified water, etc. The multiporous materials can also be applied to desalination in order to cope with the future shortage of water resources and improve water resources technology solutions. Besides, the multiporous materials have excellent conductivity and capacitance characteristics and become a new electrochemical material. Therefore, the multiporous materials can also be applied to a variety of high-power equipment, super capacitor, a variety of battery electrode materials, to provide renewable energy with energy storage and energy conversion equipment solutions.

The existing multiporous carbon material production technology is generally using the macromolecules, phenolic compounds, aldehydes, acid catalyst and other ingredients as the precursor, or directly heating and then activate its carbon material properties of the raw material. According to the definition of the size of the pores in international standard, the pore size is usually regarded as mesopores in the range of 2 to 50 nm, and micropores are smaller than 2 nm, and macropores are greater than 50 nm. The multiporous carbon material of the present invention is defined by the pore distribution, which contains at least two above-mentioned pore diameters corresponding to a certain ratio.

U.S. Pat. No. 8,828,533 B2 indicates a production method of conductive carbon material having a mesoporous of 10~50 nm by mixing a precursor of components containing a polymer, a phenolic compound, an aldehyde, an acidic catalyst. ho and the like as a precursor to produce a However, the present invention provides a production method by using the characteristics of bio-oils, which does not add additional conductive carbon material, aldehydes, acid catalyst.

U.S. Pat. No. 8,114,510 B2 indicates a production method of conductive carbon material having a mesoporous of 4~10 nm, 400~700 m²/g by mixing a precursor of components containing a polymer, a phenolic compound, an aldehyde, an acidic catalyst. ho and the like as a precursor to produce a However, the present invention provides a production method by using the characteristics of bio-oils, which does not add additional conductive carbon material, aldehydes, acid catalyst. In addition, the surface area of the carbon material produced by the present invention is larger than the carbon material disclosed in U.S. Pat. No. 8,114,510 B2.

U.S. Pat. No. 4,937,223 indicates an alkaline activation method, which means the carbon material is produced by carbonization of lignin (papermaking waste) at high temperature. The formula used is different from the present invention and does not have a specific pore size distribution. The product from the production method is only general activated carbon.

EP 2025656 A1 discloses a production method of carbonaceous material at atmospheric pressure or low pressure using wood chips having a particle size of 20 to 125 μm. The prior art can be used to produce a multiporous metal material, which is different from the multiporous carbon materials produced from the bio-oil product of the present invention.

US 2014/0227325 A1 indicates a production method of carbonaceous materials having a mesoporous 4 to 10 nm, which uses mixed macromolecules, lignin, phenolic compounds, aldehydes and acid catalysts as precursors. However, the production method of the present invention does not need any aldehydes, acid catalyst during the production of carbon materials from thermal bio-oil.

The above-mentioned prior art for producing multiporous carbon materials is generally us using higher cost polymers as a precursor, such as phenols, aldehydes and acid catalysts. Besides, more complicated processes are required in prior art, and the carbon material products do not have a specific pore size distribution. Therefore, the needs of industrial applications, such as cost reduction, process simplification, improve the performance of carbon materials, are extremely important to solve these problems.

SUMMARY OF THE INVENTION

In order to overcome the above-mentioned deficiencies of the prior art, the present invention provides a method for producing a multiporous carbon material by using a raw material for producing a multiporous carbonaceous material. The invention provides a method for making multiporous carbon material from a bio-oil produced by a biomass thermochemical process. The bio-oil is blended with a resin and a Zinc Oxide (ZnO) template as a major component of a precursor. The pore sizes of the carbon material made by the invention comprise mesopores and micropores to form the multiporous carbon material. The main production steps include: (1) mixing the precursor with a crusher, (2) packing the precursor, (3) heating for carbonization: holding 350° C. for 1 hour then holding 900° C. for 2 hours, and (4) remove the ZnO in water with hydrochloric acid by adjusting the pH value to less than 1.

The present invention has at least the following advantages:

(1) The invention provides a novel technology for making multiporous carbon material by mixing raw bio-oil, active agent and template, then heat the mixture to produce multiporous carbon material. Therefore, overcoming the difficulty of controlling the specific pore size distribution in prior art.

(2) The present invention provides a carbon material with micropores which is utilizing the characteristic of high oxygen content in bio-oil produce micropore at high temperature. The present invention can produce the carbon material with multiple pores with the template, so as to overcome complexity of the prior art to simplify the production method.

(3) In the production of prior art, high cost precursors, such as polymer, phenolic compounds, aldehydes and acid catalysts are required. The present invention provides a low-cost precursor for making multiporous carbon materials by bio-oils, so as to achieve the effect of reducing costs.

(4) The present invention provides a carbon material which can produce micropore without adding aldehydes and acid catalysts in the entire process. In contrast, the present invention utilizes the characteristics of the raw bio-oil itself and its high oxygen content, so as to simplify the process and reduce the cost of process.

(5) The invention provides a technique for making multiporous carbon material by using the s bio-oil produced by the thermo-chemical process, resin and zinc oxide template, so that the obtained carbon material has both mesoporous and microporous characteristics and enhance the performance of multiporous carbon material effect.

DETAILED DESCRIPTION OF THE INVENTION

By way of illustration, the specific embodiments will be disclosed in detail below, however, the features of the invention are not limited to these embodiments.

Please refer to FIG. 1 to FIG. 9, which further illustrate the details of method for making multiporous carbon material of the present invention.

Figure 1:
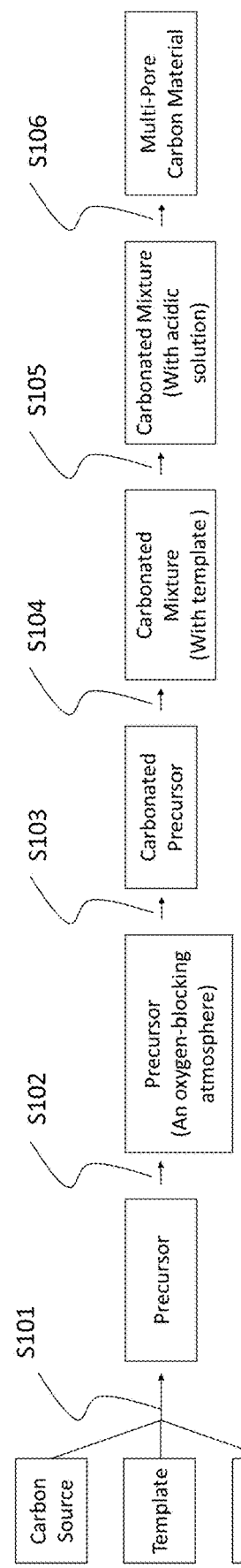
FIG. 1 is a schematic diagram of the process making multiporous carbon material by mixing raw biomass chemical oil of the present invention.

Please refer to FIG. 1, which is a flow chart showing a method for making multiporous carbon material, which comprises the steps of:

(1) Mixing a carbon source, a template and a resin, to obtain a precursor S201, wherein the carbon source is a bio-oil or a carbon powder; the bio-oil is a pyrolysis oil, a carbonized tar, a lignin or a liquid phase product by carbonization, thermal cracking, gasification from a raw material; the oxygen content of the bio-oil is in the range of 20~60%; the high calorific value of the bio-oil is in the range of 3,500~4,500 cal/g; the high value of the carbonized tar is in the range of 3,500~7,000 cal/g; the carbon powder is produced by a pyrolysis process; the resin is a phenolic resin; the template is zinc oxide or calcium carbonate; the template has a size ranging from 5~100 nm; the weight of the template is 50~95% by weight based on the total weight of the precursor.

(2) Placing the precursor in a low oxygen atmosphere S102, wherein the low oxygen environment is an environment in which the oxygen content is 0.5% or less;

(3) Raising the temperature to 250~400° C. in the environment of the low oxygen atmosphere, and waiting the mixture to carbonization S103;

(4) Raising the temperature to 800~900° C. in the environment of the low oxygen atmosphere, and holding the temperature for a reaction time to obtain a carbonated mixture S104;

(5) Washing the carbonized mixture with an acidic solution having a pH lower than 1 to remove the template S105; and (6) Washing the carbonized mixture to remove the remaining acidic solution, and obtaining a multiporous carbon material S106.

The multiporous carbon material obtained by the method for making multiporous carbon material of the present invention, having micropores and mesopores, wherein the surface area ratio of the micropores ranges from 0 to 30%.

The following five examples show the process for producing a multiporous carbon material by using different components and different weight ratios of mixture from the bio-oil as a precursor respectively. The and the process of producing the multiporous carbon material of FIG. 1 show the characteristics of multiporous carbon material.

Example 1

Figure 2:
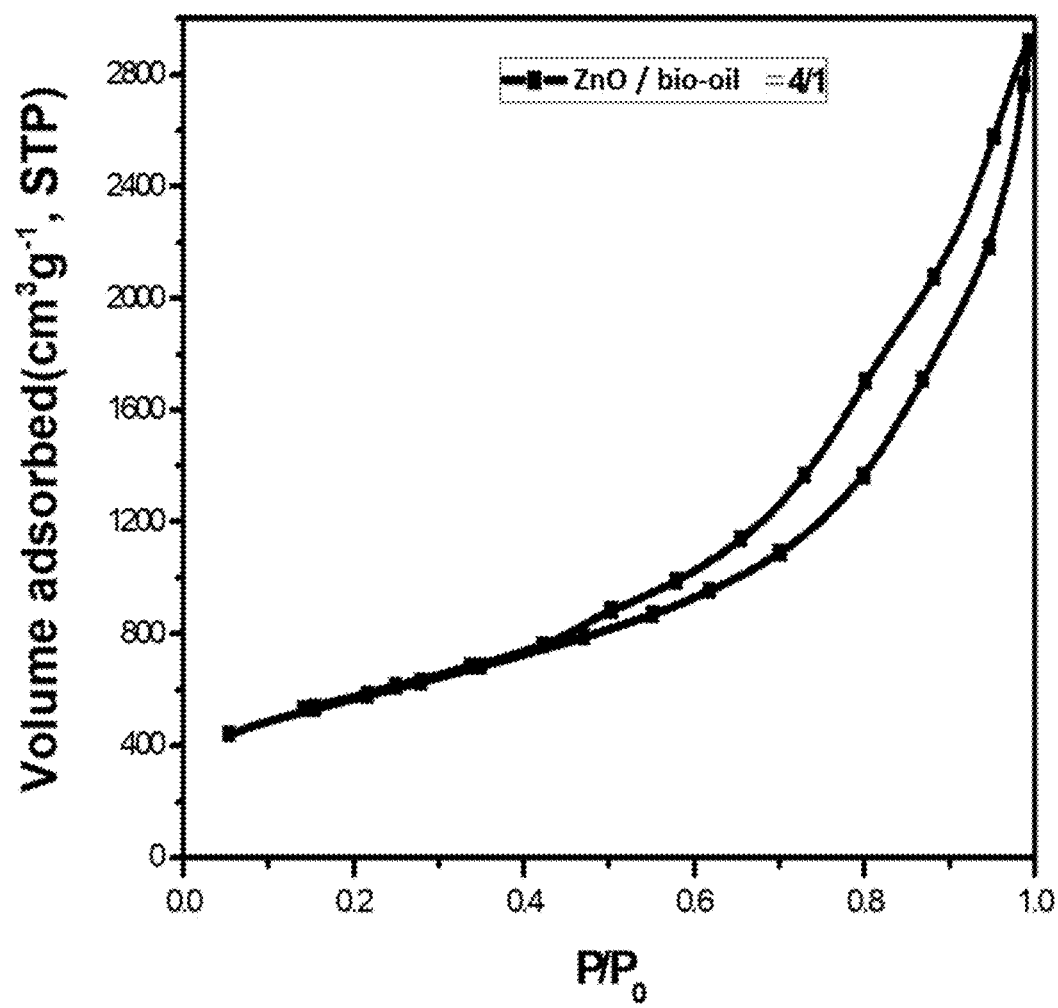
FIG. 2 is a characteristic curve shows the multiporous carbon material measured at an average value and maximum value (precursor-ZnO:bio-oil=4:1) in the example 1 of the present invention.
Figure 3A:
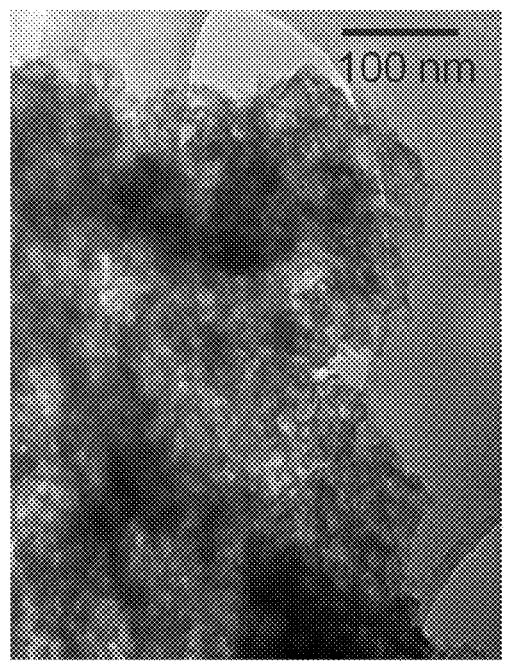
FIGS. 3A and 3B show the transmission electron microscopic images of the multiporous carbon material measured at an average value and maximum value (precursor-ZnO:bio-oil=4:1) in the example 1 of the present invention.
Figure 3B:
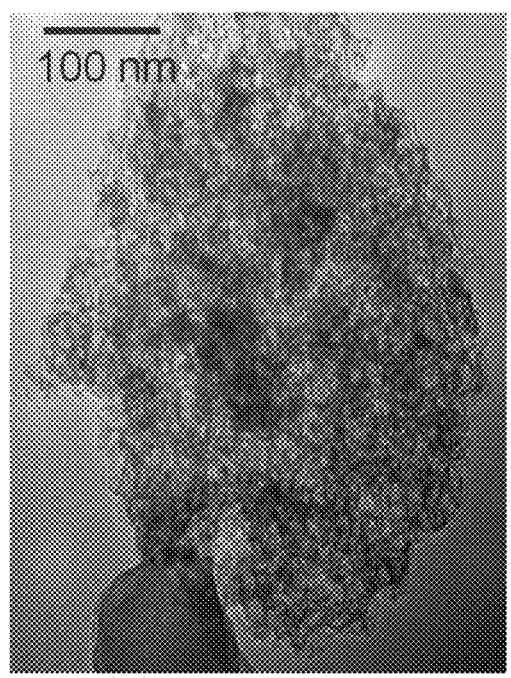

As shown in FIG. 2, FIG. 3 and Table 1, the characteristic curve shows the multiporous carbon material measured at an average value and maximum value (precursor-ZnO:bio-oil=4:1) in the example 1 of the present invention and the multiporous carbon material. The process of making the multiporous carbon material by using the bio-oil is shown in FIG. 1, The precursor is prepared at a 4:1 weight ratio of ZnO and bio-oil. From the above measurement data, the multiporous carbon material has high surface area, which is mainly contributed by the surface area of the micropores and mesopores.

TABLE 1

| ratio | Surface area ($m^2/g$) | micropores ($m^2/g$) | mesopores ($m^2/g$) | yield (%) |
|---|---|---|---|---|
| 4/1 | 1505 | 337 | 1167 | 13.2 |

Example 2

Figure 4:
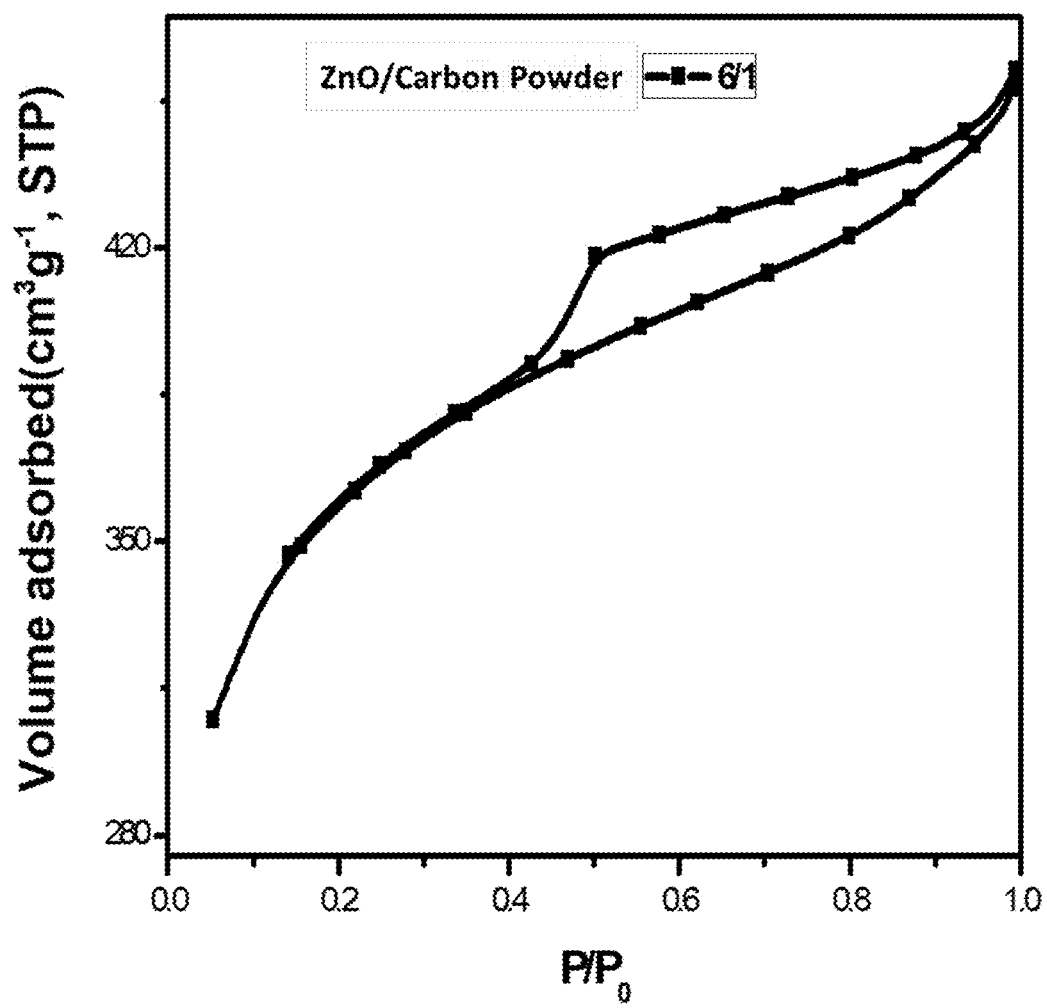
FIG. 4 shows the characteristic curve of the multiporous carbon material measured at an average value and maximum value (precursor-ZnO:carbon powder=6:1) in the example 2 of the present invention.
Figure 5:
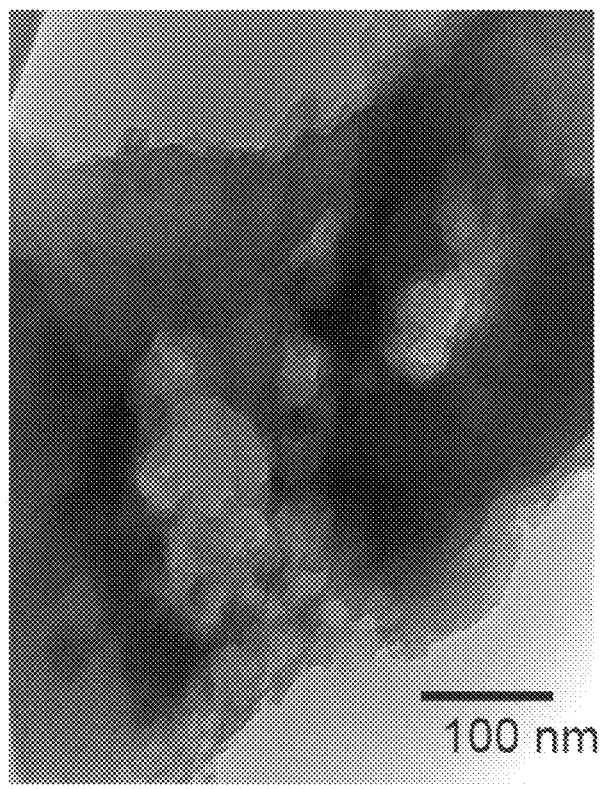
FIG. 5 shows a representative perforated electron microscope image of the multiporous carbon material of the second embodiment of the present invention.

As shown in FIG. 4, FIG. 5 and Table 2, the transmission electron microscopic images show the multiporous carbon material measured at an average value and maximum value (precursor-ZnO:carbon powder=6:1) in the example 2 of the present invention and the multiporous carbon material. The process of making the multiporous carbon material by using the bio-oil is shown in FIG. 1, The precursor is prepared at a 6:1 weight ratio of ZnO and carbon powder. From the above measurement data, the multiporous carbon material has high surface area, which is mainly contributed by the surface area of the micropores and mesopores.

TABLE 2

| ratio | Surface area ($m^2/g$) | micropores ($m^2/g$) | mesopores ($m^2/g$) | yield (%) |
|---|---|---|---|---|
| 6/1 | 1127 | 661 | 466 | 30.2 |

Example 3

Figure 6:
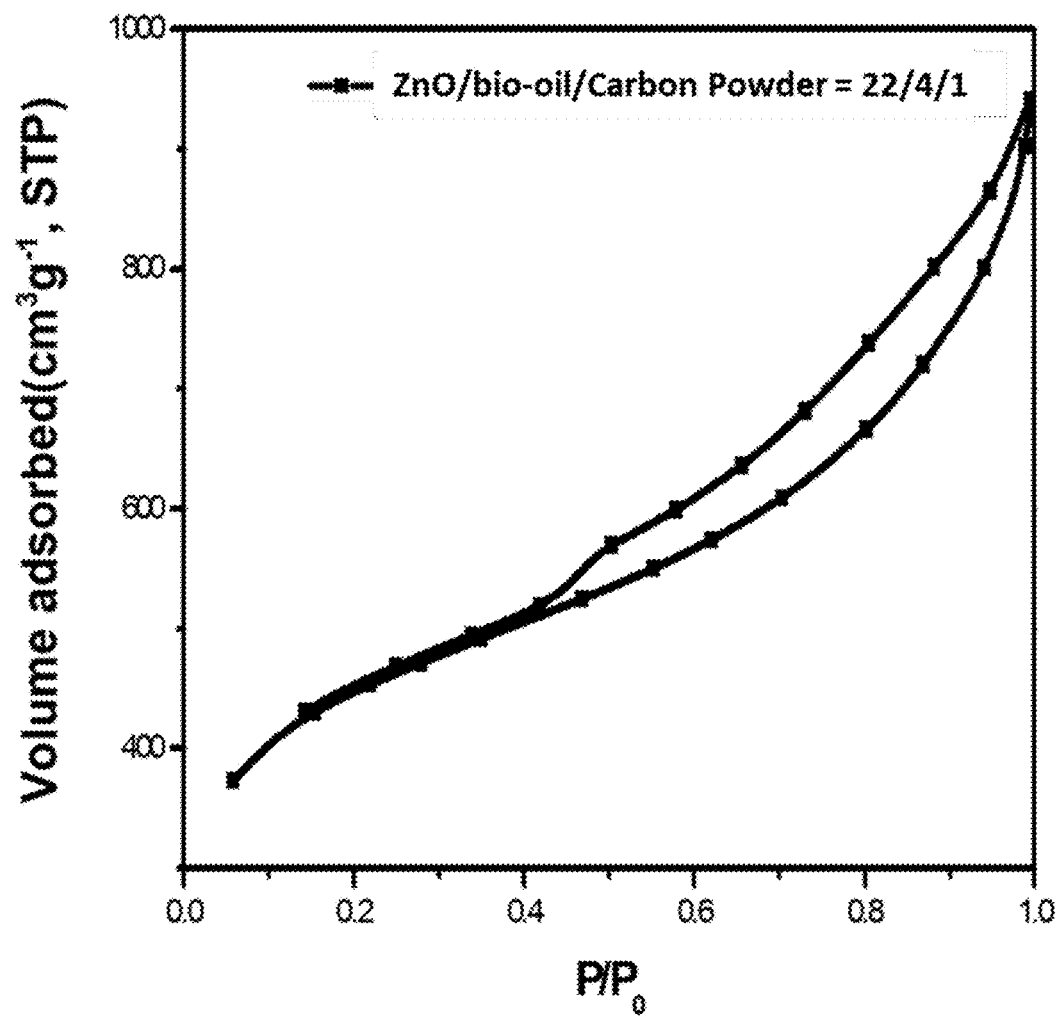
FIG. 6 is a characteristic curve of the multiporous carbon material measured at an average value and maximum value (precursor:ZnO:bio-oil:carbon powder=22:4:1) in the example 3 of the present invention.

As shown in FIG. 6 and Table 3, the characteristic curve shows the multiporous carbon material measured at an average value and maximum value (precursor-ZnO:bio-oil:carbon powder=22:4:1) in the example 1 of the present invention and the multiporous carbon material. The process of making the multiporous carbon material by using the bio-oil is shown in FIG. 1, The precursor is prepared at a 22:4:1 weight ratio of ZnO, bio-oil and carbon powder. From the above measurement data, the multiporous carbon material has high surface area, which is mainly contributed by the surface area of the micropores and mesopores.

TABLE 3

| ratio | Surface area ($m^2/g$) | micropores ($m^2/g$) | mesopores ($m^2/g$) | yield (%) |
|---|---|---|---|---|
| 22/4/1 | 1454 | 636 | 818 | 13.7 |

Example 4

Figure 7:
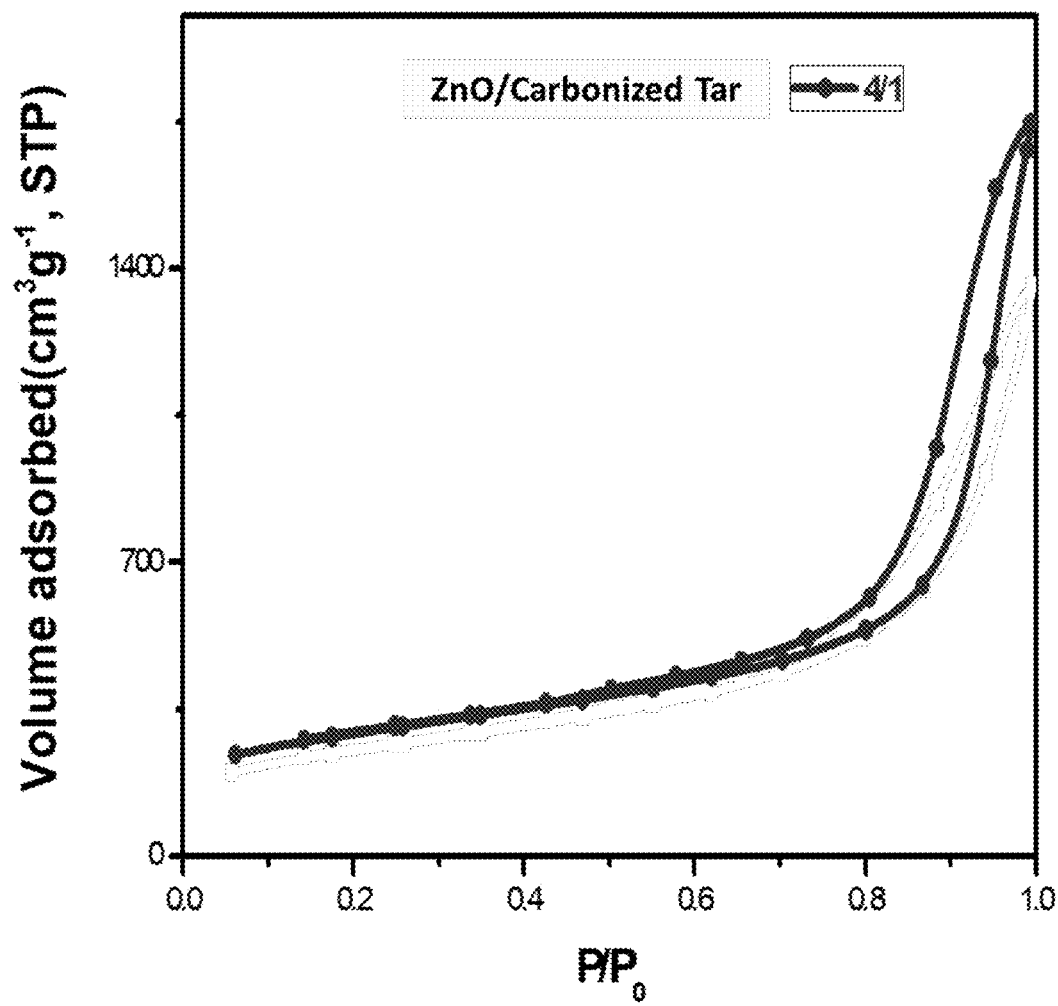
FIG. 7 is a characteristic curve of the multiporous carbon material measured at an average value and maximum value (precursor:ZnO:carbonized tar=4:1) in the example 4 of the present invention.

As shown in FIG. 7 and Table 4, the characteristic curve shows the multiporous carbon material measured at an average value and maximum value (precursor-ZnO:carbonized tar=4:1) in the example 1 of the present invention and the multiporous carbon material. The process of making the multiporous carbon material by using the bio-oil is shown in FIG. 1, The precursor is prepared at a 4:1 weight ratio of ZnO and carbonized tar. From the above measurement data, the multiporous carbon material has high surface area, which is mainly contributed by the surface area of the micropores and mesopores.

TABLE 4

| ratio | Surface area ($m^2/g$) | micropores ($m^2/g$) | mesopores ($m^2/g$) | yield (%) |
|---|---|---|---|---|
| 4/1 | 983 | 265 | 718 | 6.2 |

Example 5

Figure 8:
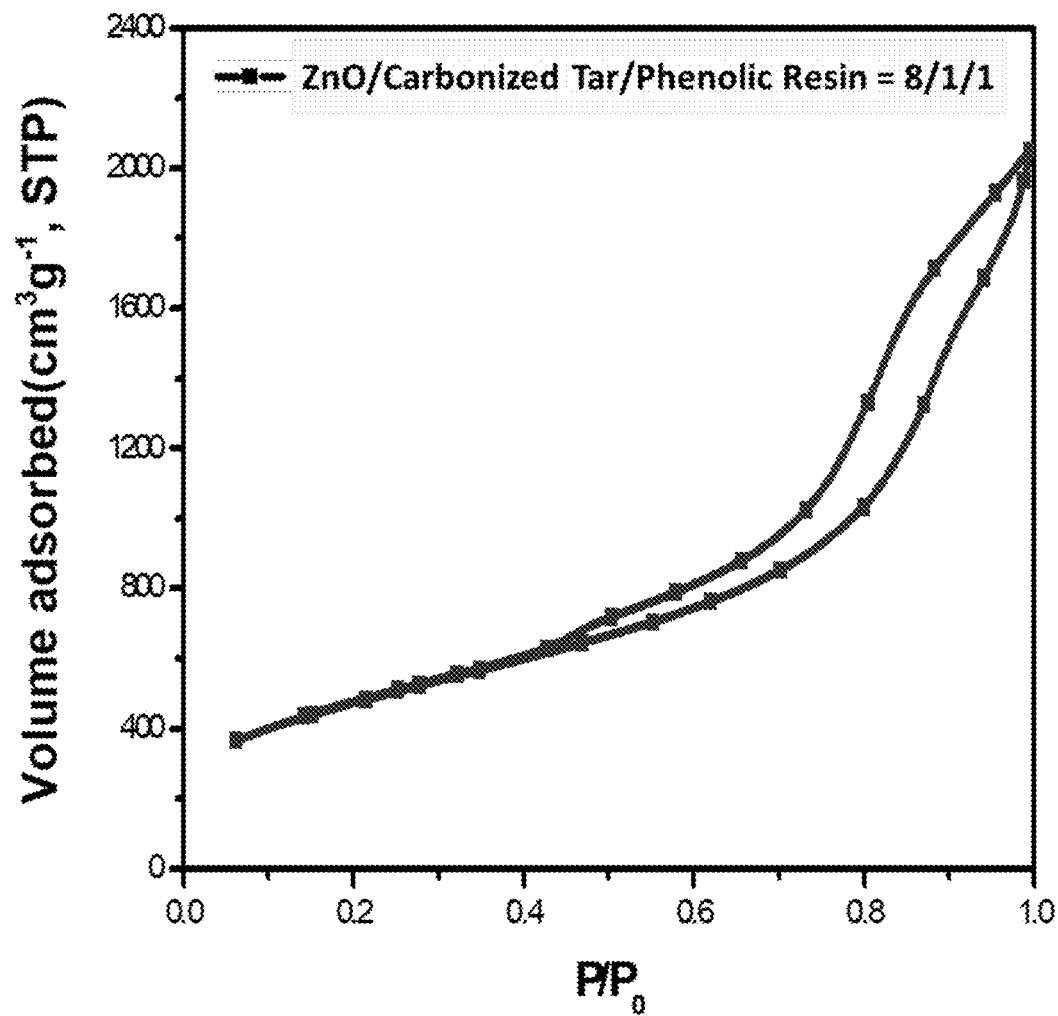
FIG. 8 is a characteristic curve of the multiporous carbon material measured at an average value and maximum value (precursor:ZnO:carbonized tar:phenolic resin=8:1:1) in the example 4 of the present invention.
Figure 9:
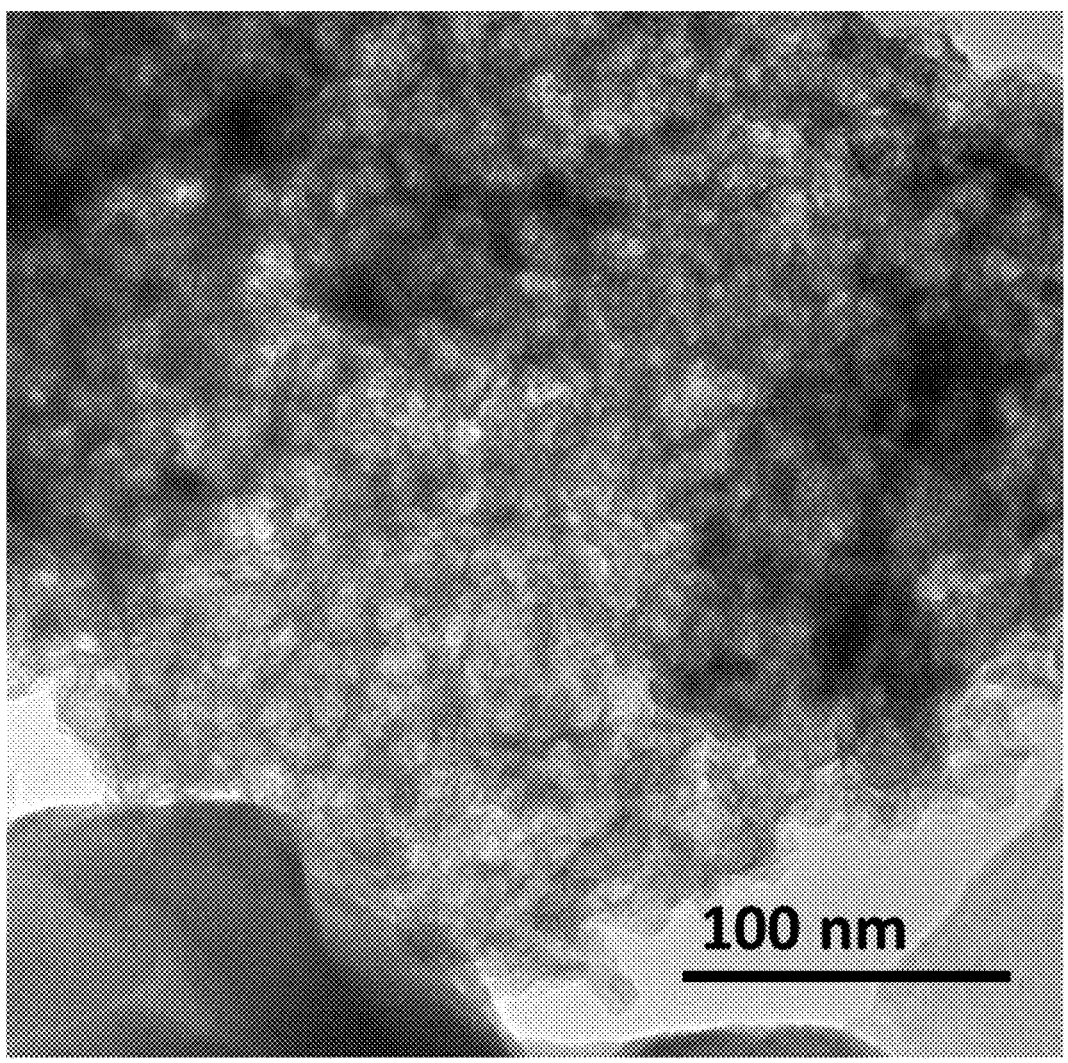
FIG. 9 shows a representative perforated electron microscope image of the multiporous carbon material in the example 5 of the present invention.

As shown in FIG. 8, FIG. 9 and Table 5, the characteristic curve shows the multiporous carbon material measured at an average value and maximum value (precursor-ZnO:carbonized tar:phenolic resin=8:1:1) in the example 5 of the present invention and the multiporous carbon material. The process of making the multiporous carbon material by using the bio-oil is shown in FIG. 1, The precursor is prepared at a 8:1:1 weight ratio of ZnO, carbonized tar and phenolic resin. From the above measurement data, the multiporous carbon material has surface area, which is mainly contributed by the surface area of the micropores and mesopores.

TABLE 5

| ratio | Surface area ($m^2/g$) | micropores ($m^2/g$) | mesopores ($m^2/g$) | yield (%) |
|---|---|---|---|---|
| 8/1/1 | 1685 | 102 | 1583 | 7.5 |

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A method for making a multiporous carbon material, which comprises the steps of:
    (1) mixing a carbon source and a template to obtain a precursor; wherein the template comprises zinc oxide, the carbon source is a bio-oil, and the weight percentage of the carbon source and the template relative to the precursor is 15-25% and 75-85%, respectively;
    (2) placing the precursor in a low oxygen atmosphere;
    (3) raising a temperature to 250~400° C. in an environment of the low oxygen atmosphere, and waiting for the precursor to carbonize;
    (4) raising the temperature to 800~900° C. in the environment of the low oxygen atmosphere, and holding the temperature for a reaction time to obtain a carbonized mixture;
    (5) washing the carbonized mixture with an acidic solution having a pH lower than 1 to remove the template; and
    (6) washing the carbonized mixture to remove the remaining acidic solution, and obtaining the multiporous carbon material;
    wherein the low oxygen atmosphere is an environment in which the oxygen content is 0.5% or less,
    wherein the bio-oil is carbonized tar, wherein a high calorific value of the carbonized tar is in the range of 3,500~7,000 cal/g.

2. The method of claim 1, wherein an oxygen content of the bio-oil is in the range of 20~60%.

3. The method of claim 1, wherein the template comprises calcium carbonate.

4. The method of claim 1, wherein the template has a size ranging from 5~100 nm.

* * * * *